United States Patent [19]

Singh

[11] 4,234,968
[45] Nov. 18, 1980

[54] OPTICAL COUPLER MODULE IN A DISTRIBUTED PROCESSING SYSTEM

[75] Inventor: Amar J. Singh, Escondido, Calif.
[73] Assignee: NCR Corporation, Dayton, Ohio
[21] Appl. No.: 939,726
[22] Filed: Sep. 5, 1978
[51] Int. Cl.[3] .................. H04B 9/00; G02B 5/172
[52] U.S. Cl. ........................... 455/607; 350/96.16
[58] Field of Search ... 364/200 MS File, 900 MS File; 250/199; 324/96, 97; 350/96.15, 96.16, 96.1, 96.17, 96.2, 96.23, 96.3; 455/606, 607; 358/901

[56] References Cited

U.S. PATENT DOCUMENTS

| | | | |
|---|---|---|---|
| 3,870,396 | 3/1975 | Racki et al. | 350/96.16 |
| 4,027,153 | 5/1977 | Käch | 250/199 |
| 4,061,577 | 12/1977 | Bell | 250/199 |
| 4,089,584 | 5/1978 | Polczynski | 250/199 X |
| 4,090,067 | 5/1978 | Bell et al. | 250/199 |
| 4,107,518 | 8/1978 | McMahon | 250/199 |
| 4,112,293 | 9/1978 | Käch | 250/199 |
| 4,161,650 | 7/1979 | Caouette et al. | 250/199 |
| 4,161,651 | 7/1979 | Sano et al. | 250/199 |

OTHER PUBLICATIONS

Rawson and Metcalfe, "Fibernet: Multimode Optical Fibers For Local Computer Networks"—IEEE Transactions on Communications, vol. Com-26, No. 7, Jul. 1978—pp. 983-990.

Primary Examiner—Joseph F. Ruggiero
Attorney, Agent, or Firm—J. T. Cavender; Edward Dugas; Stephen F. Jewett

[57] ABSTRACT

An optically linked distributed data processing system having a plurality of stations and first and second transmission lines associated with each station. The first transmission line carries optical signals to its associated station and the second transmission line carries optical signals from its associated station. An active optical coupler module couples each first transmission line to every second transmission line. The coupler module includes a tapered waveguide for directing the optical signals from each of the first transmission lines to a single optical path, an optical detector for converting the optical signals to electrical signals, an amplifier for amplifying the electrical signals. In one embodiment a single optical source converts the amplified electrical signals back to optical signals, and in a second embodiment a plurality of optical sources, one for each of the second transmission lines, convert the amplified electrical signals back to optical signals.

2 Claims, 3 Drawing Figures

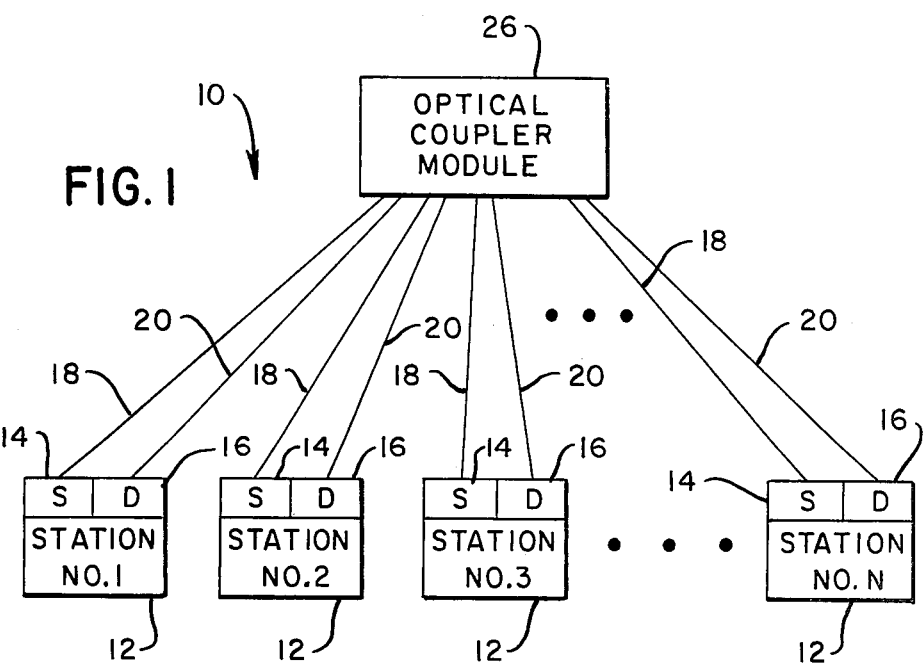
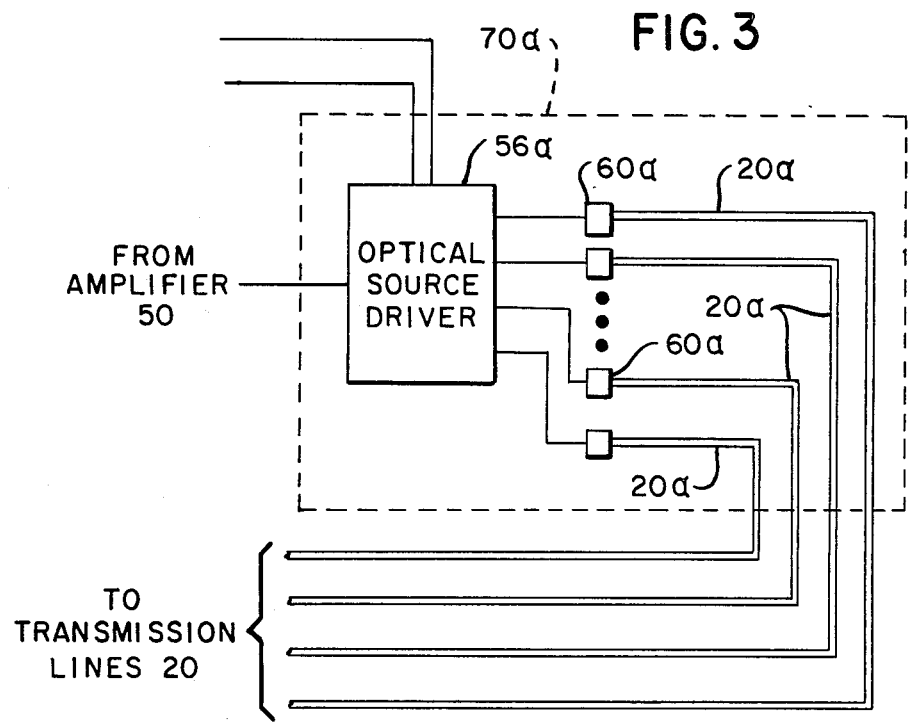

OPTICAL COUPLER MODULE IN A DISTRIBUTED PROCESSING SYSTEM

BACKGROUND OF THE INVENTION

The present invention relates to an optically linked data processing system, and more particularly, to a coupler module for coupling optical transmission lines and a plurality of stations in such a system.

Fiber-optic transmission of data offers many advantages over the conventional forms of data transmission in data processing systems. Optical signals are generally immune to errors caused by electromagnetic interference (EMI) and radio frequency interference (RFI), and do not spark or short circuit. Furthermore, fiber-optic transmissions eliminate ground loop problems by providing electrical isolation between optically linked equipment.

In a distributed processing system, it is frequently necessary for plural processing stations to communicate with each other, as well as with peripheral equipment. A distributed processing system does not rely on a large central processing station to control all the operations performed within the system. Rather, many of the stations within the system perform their own processing, and when the processing requirements exceed the capability of any one station, another processing station assists.

Several considerations are often encountered in the design of optically linked processing systems. One is speed, and in copending U.S. application Ser. No. 939,727, entitled "Bidirectional Optical Coupler for a Data Processing System", by Amar J. Singh, filed Sept. 5, 1978, there is provided an optically linked system wherein two stations may communicate with each other simultaneously, rather than one station waiting until it receives the end of a transmission and the bus is clear before it can reply.

A second consideration in designing optically linked data processing systems, and particularly a distributed processing system, is that provisions be made for assuring the validity of signals carried over the transmission lines. For example, if two stations should accidentally transmit signals simultaneously, the resulting signal would be invalid and could not carry useful information to any other stations. Signal validity can be assured by having one station receive and record every signal and then replay or retransmit the signal so that the original transmitting station can compare or evaluate the retransmitted signal for accuracy. However, the time taken by a station to receive and then retransmit every signal obviously decreases the total operating speed and efficiency of the system.

SUMMARY OF THE INVENTION

In accordance with the present invention, a data processing system having a plurality of stations includes a first transmission line carrrying an optical signal from an optical source in each of the stations, a second transmission line carrying an optical signal to an optical detector in each of the stations, and an optical coupler module coupling the first transmission line from each station to every second transmission line.

The coupler module in the preferred embodiments is an active coupler, since it amplifies the optical signal received from each station. The coupler module includes optical waveguide means, in the form of a tapered optical waveguide, for receiving the optical signal carried on any of the first transmission lines and directing the optical signal to a single optical path, an optical detector for converting the optical signal on the single path to an electrical signal, an amplifier for amplifying the electrical signal, and an optical source and source driver for converting the amplified electrical signal back to an optical signal. In one embodiment, a waveguide interface receives the optical signal from the coupler module's optical source and carries the optical signal to a plurality of waveguide segments for distributing the amplified optical signal to each of the second transmission lines returning to the optical detector in each of the stations.

From the above, it can be seen that in the disclosed data processing system a station transmits an optical signal along its associated first transmission line and simultaneously receives back, along with each of the other stations, the same optical signal along its associated second transmission line. If an invalid signal is received back, indicating, for example, that some other station is also transmitting, the original signal can be retransmitted by the station after the transmission lines clear.

The active coupler module coupling the first and second transmission lines in the disclosed data processing system amplifies the optical signals so that the signals will not be affected by losses occurring in the coupler module and the transmission lines and so that the optical sources at each station may transmit an optical signal at a relatively low intensity level regardless of the number of stations subsequently added to the system and the length of the transmission lines between the stations.

It is therefore an object of the present invention to provide an improved data processing system having a plurality of optically linked stations.

A further object of the present invention is to provide an improved optical coupler module for use in a distributed data processing system.

Still a further object of the present invention is to provide an optical coupler module which permits any number of stations to be added in a data processing system.

Yet another object of the present invention is to provide a data processing system having a plurality of optically linked stations wherein each station can simultaneously receive back the signal it is transmitting.

These and other objects and advantages will become more apparent from the following description taken in conjunction with the accompanying drawings throughout which like characters indicate like parts and which drawings form a part of the present application.

BRIEF DESCRIPTION OF THE DRAWINGS

FIG. 1 is a block diagram showing a data processing system in accordance with the present invention.

FIG. 3 is a diagram showing in part an alternative embodiment of the coupler module shown in detail in FIG. 2.

DETAILED DESCRIPTION OF THE PREFERRED EMBODIMENT

Figure 2:
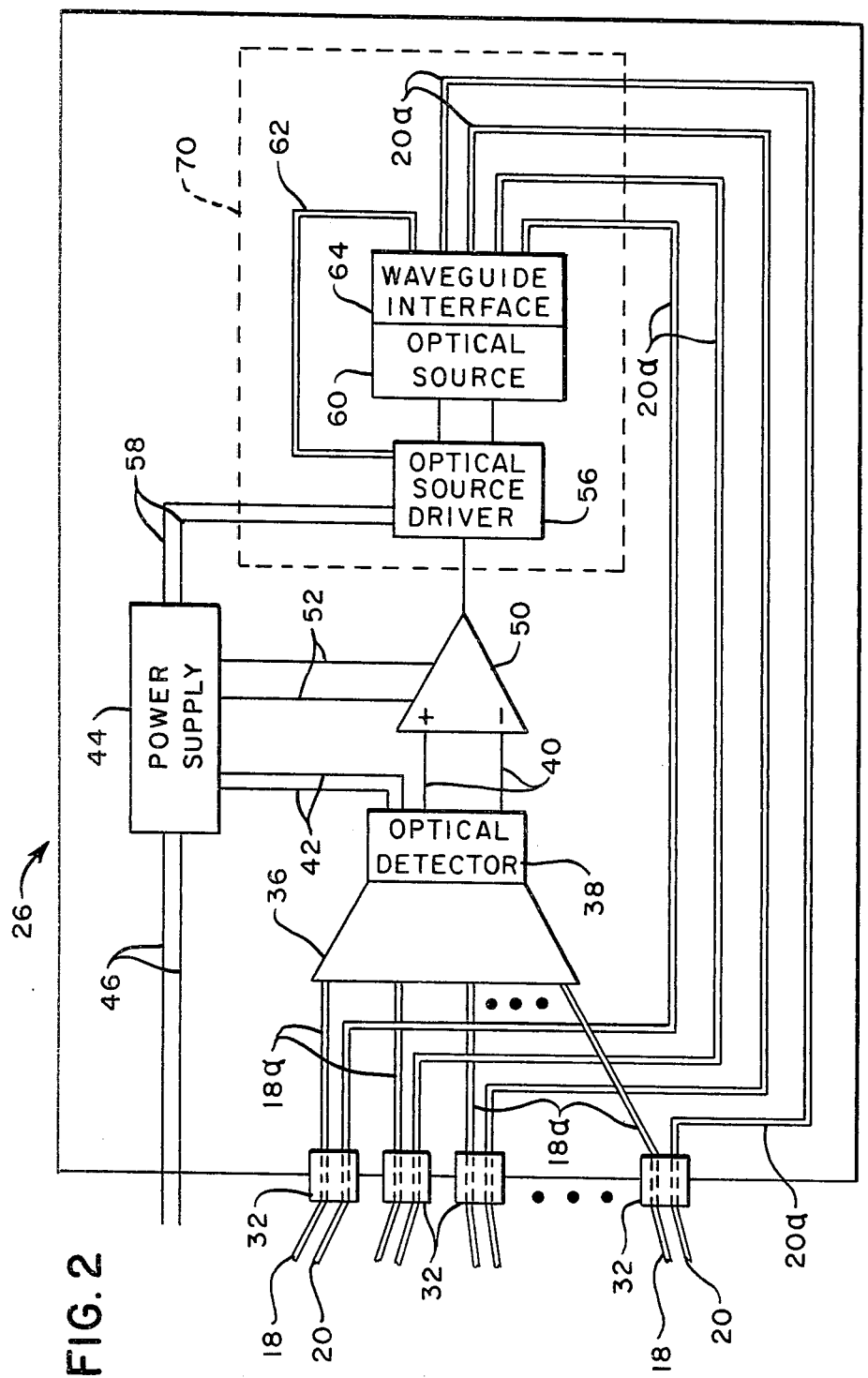
FIG. 2 is a diagram showing in detail the coupler module illustrated in FIG. 1.

Referring now to FIG. 1, there is shown a data processing system 10 having a plurality of optically linked stations 12 in accordance with the present invention.

The stations 12 are numbered 1 through N and represent a variety of data processing equipment. In the preferred embodiment, the system 10 has distributed processing and any one of the stations 12 may have a need to communicate with any other of the stations. By distributed processing it is meant that the total processing capabilities will be shared at least among several of the stations and that at least several of the stations will be processors or will have processing capability. In addition, the stations 12 may also represent peripheral equipment such as card readers, operator panels, CRT's and the like.

Since the stations are optically linked, each station 12 includes an optical source 14 which is capable of generating optical signals representing data, and an optical detector 16 which receives and converts optical signals into electrical signals usable by the station. Optical sources and detectors are well-known in the art. For example, the light source 14 could include a device such as the model No. 30123 light source sold by RCA Solid State Division/Electro-optics and Devices, Lancaster, Pennsylvania, and the light detector 16 could include a silicon photo diode such as the PIN-3D diode sold by United Detector Technology, Inc. of Santa Monica, California.

Each station 12 has the optical signal generated from its optical source 14 carried by a first transmission line 18, and the optical signal delivered to its optical detector 16 carried by a second transmission line 20. The transmission lines 18 and 20 are conventional single fiber optical waveguides, and the pair associated with each station may be enclosed in a single bus cable.

An optical coupler module 26 receives the transmission lines 18 and 20 from each station 12, and in a manner which will be described later, couples the transmission line 18 from each station to the transmission line 20 going to every station.

In operation, each station 12 in the system 10 will at least occasionally have the need to communicate with another station, either to assist in the processing being performed by the first station or to receive or transmit data to peripheral equipment. For example, when station No. 1 desires to commmunicate with station No. 3, an optical signal transmitted over transmission line 18 from station No. 1 is carried to coupler module 26 and from there is transmitted to the transmission line 20 going to every station, including the station where it originated, station No. 1. The signal is, of course, addressed only for station No. 3. However, station No. 1 receives back the optical signal it has transmitted so that it may check the signal for any invalidity or error. Such invalidity or error could arise, for example, from another station accidentally transmitting at the same time as station No. 1. If such is the case, station No. 1 can wait for the transmission lines to clear and then again transmit the original signal. The arrangement whereby each station will always receive back its own signal on transmission line 20, even as it is simultaneously transmitting over transmission line 18, provides a means for quickly and efficiently detecting invalid messages. Furthermore, there is no delay as there would be in a system having a single, bidirectional optical transmission line, where the optical signal can be replayed to the original transmitting station only after the transmission line clears.

Turning now to FIG. 2, the coupler module 26 is shown in detail. Coupler module 26 includes a plurality of dual fiber connector assemblies 32 for receiving transmission lines 18 and 20 from each of the stations 12. The connector assemblies 32 connect each of the transmission lines 18 to a waveguide segment 18a and each of the transmission lines 20 to a waveguide segment 20a. The waveguide segments 18a and 20a are conventional, single fiber waveguide segments having a transparent core and a reflective coating or cladding.

Each of the segments 18a carries a signal from its associated transmission line 18 to a tapered waveguide 36. The waveguide 36 has the shape of a truncated cone, with a transparent core and a reflective coating about its tapered surface, so that an optical signal on any one of the segments 18a presented to its larger end face is directed towards its opposite, smaller end face. The signal on any one of the segments 18a is thus confined or directed to a single optical path defined by the smaller end face. At the smaller end face is an optical detector 38 which converts the optical signal from the waveguide 36 to an electrical voltage across a pair of leads 40. The optical detector 38 may be a device similar to the optical detector 16 in each station 12, described earlier with reference to FIG. 1.

The optical detector 38 receives a proper biasing or power voltage at power leads 42 from a power supply 44. The power supply 44 may be any conventional power supply receiving an AC or DC voltage across a pair of power leads 46 and capable of supplying the needed voltages or power requirements of the components within the coupler module 26.

The voltage across the leads 40 is amplified by an amplifier 50 which also receives power at its power leads 52 from the power supply 44.

The output of amplifier 50 is delivered to an optical source drive 56, also powered by a voltage from power supply 44 received at its power leads 58. The driver 56 delivers an electrical driving signal to an optical source 60 for conversion to an optical signal. The optical source driver 56 includes conventional circuitry for speeding up the rise time of the signal delivered to the optical source 60, and permitting adjustments in the driving signals delivered to the optical source 60 to compensate for varying operating conditions. The driver 56 includes an optical detector (not shown) for monitoring optical feedback signals from the optical source 60, brought to the driver by an optical waveguide segment 62.

An optical waveguide interface 64 receives at one end face the optical signal generated by the optical source 60 and provides the optical signal, at its opposite end face, to the feedback waveguide segment 62 as well as to the waveguide segments 20a. It is preferable, in order to eliminate optical signal losses, that the one end face of waveguide interface 64 receiving the optical signal from optical source 60 have a sufficiently large area to capture all of the optical signals, and that the opposite end face of the waveguide interface 64 that meets the waveguide segments 20a and 62 have an area as close as possible to the total area of the confronting end faces of the waveguide segments 20a and 62. The waveguide interface 64, although of a substantially larger diameter than any one of the waveguide segments 20a and 62, has a similar construction, with a transparent core and a reflective coating or cladding surrounding the core.

The optical signals on the waveguide segments 20a are delivered through the connectors 32 to each of the transmission lines 20, and from there back to each of the stations 12.

In FIG. 3, there is shown an alternative embodiment of a portion of the coupler module 26. The box formed by broken lines 70 in FIG. 2 illustrates that portion of the coupler module 26 which could be replaced by the alternative arrangement shown in broken lines 70a in FIG. 3.

As seen in FIG. 3, a light source driver 56a delivers, in response to the signal from the amplifier 50, an identical electrical driving signal to each of plural optical sources 60a. Each optical source 60a converts the electrical driving signal to an optical signal which is then carried by each of the optical waveguide segments 20a to the transmission lines 20. As can be seen by comparing FIGS. 2 and 3, the embodiment of FIG. 3 does not provide an optical feedback to the optical source driver. However, since each optical source 60a in FIG. 3 provides an optical signal to only one waveguide segment 20a, the optical waveguide interface 64 is eliminated, and the driving current to and the optical signal intensities from the source 60a may be much lower than those to and from the optical source 60 in FIG. 2.

Although presently preferred embodiments of the invention have been described, it should be understood that various changes may be made within the scope of the appended claims.

What is claimed is:

1. An optical coupler for a distributed data processing system having a plurality of stations, a first transmission line from an optical source in each of said stations, and a second transmission line to an optical detector in each of said stations, the coupler comprising:

optical waveguide means for receiving optical signals from any said first transmission line and directing the optical signals to a single optical path;

means for amplifying the optical signals on the single optical path, including optical detector means for converting the optical signals on the single optical path to electrical signals, electrical amplifying means for amplifying the electrical signals from said optical detector means, and optical source means for converting the amplified electrical signals to optical signals, said optical source means including an optical source driver; and means for distributing the amplified optical signals to each said second transmission line, including a waveguide interface for receiving the optical signals from said optical source means at one end face and having an opposite end face cooperating with a plurality of waveguide segments to provide the optical signals received at the one end face to each of the waveguide segments, one of the waveguide segments providing a feedback signal to said optical source driver, and each of the other waveguide segments providing the optical signals from the waveguide interface to an associated second transmission line.

2. The coupler of claim 1 wherein said optical waveguide means for receiving the optical signals from any said first transmission line comprises a tapered waveguide having a larger end face for receiving the optical signals from each said first transmission line and an opposite, smaller end face defining the single optical path.

* * * * *